United States Patent [19]

Hara et al.

[11] Patent Number: 4,492,846

[45] Date of Patent: Jan. 8, 1985

[54] PROCESS FOR THE PRODUCTION OF BONDED HARD ALLOYS

[75] Inventors: Akio Hara; Masaya Miyake; Shuji Yazu, all of Itami, Japan

[73] Assignee: Sumitomo Electric Industries, Ltd., Osaka, Japan

[21] Appl. No.: 433,533

[22] Filed: Oct. 8, 1982

[30] Foreign Application Priority Data

Oct. 15, 1981 [JP] Japan .................. 56-165440

[51] Int. Cl.$^3$ .............................................. B23K 27/00
[52] U.S. Cl. ...................... 219/121 LC; 219/121 EC
[58] Field of Search .......... 219/118, 121 EC, 121 ED, 219/121 LC, 121 LP, 121 PJ, 121 PK

[56] References Cited

U.S. PATENT DOCUMENTS

| | | | |
|---|---|---|---|
| 3,466,418 | 9/1969 | Webb | 219/118 X |
| 3,561,099 | 2/1971 | Mizuhara | 219/121 ED |
| 3,591,917 | 7/1971 | Shira et al. | 219/118 |
| 3,988,563 | 10/1976 | Swengel, Sr. et al. | 219/118 X |
| 3,999,031 | 12/1976 | Yonezawa et al. | 219/121 ED |

*Primary Examiner*—C. L. Albritton
*Attorney, Agent, or Firm*—Wenderoth, Lind & Ponack

[57] ABSTRACT

Process for the production of bonded hard alloys, which comprises inserting a thin sheet of a Fe group metal or its alloy as a filler in between the surfaces of at least one kind of hard alloy, and applying a high energy beam to a part or all of the thin sheet to melt and solidify the thin sheet in a slit form, thereby bonding the hard alloys together.

5 Claims, 5 Drawing Figures

PROCESS FOR THE PRODUCTION OF BONDED HARD ALLOYS

BACKGROUND OF THE INVENTION

1. Field of the Invention

This invention relates to a process for the production of bonded hard alloys and more particularly, it is concerned with a process for bonding one or more kind of hard alloys using a high energy beam.

2. Description of the Prior Art

Bonding of a plurality of tool parts of hard alloys such as cemented carbides to obtain a tool formed in one body would result in various merits such as making it possible to obtain an article with a complicated shape or with such a large size as to exceed the limit reached by cemented carbides. It would also be possible to combine two or more kinds of hard alloys having different properties. However, since the melting point of the hard alloy is so high that a high temperature, e.g. 1320° C. or higher is required for forming a liquid phase of the alloy, there is no way to accomplish this except by effecting diffusion bonding in a furnace under pressure.

Therefore, the most economical bonding method comprises using a silver braze or copper braze, but the bonding using such a braze is poor, in particular, when wetting of the braze is inferior. Furthermore, even if the bonding is completed, a shearing strength only about 10 to 20 kg/mm$^2$ is expected.

When cemented carbides are used as a structural part or as a wear resisting tool such as a die, slitter and bit, a higher shearing force, fatigue strength and impulsive force are required.

Thus, it has eagerly been desired to develop a bonding method whereby cemented carbides can be bonded easily and completely independently of their shapes or sizes.

SUMMARY OF THE INVENTION

Accordingly, it is an object of the present invention to provide a process for the production of bonded hard alloys.

It is another object of the present invention to provide an improved method of bonding cemented carbides by a high energy beam.

It is a further object of the present invention to provide a tool of cemented carbides bonded together through an interlayer of an iron group metal or its alloy.

These objects can be attained by a process for the production of bonded hard alloys, which comprises butting or contacting pieces of one or more kinds of hard alloys, inserting a thin sheet of an iron group metal or its alloy between the contacted surfaces of the hard alloys, and applying a high energy beam to a part or all of the thin sheet to melt and solidify it, thereby bonding the hard alloys together.

BRIEF DESCRIPTION OF THE DRAWINGS

The accompanying drawings illustrate the principle and merits of the present invention in detail.

DETAILED DESCRIPTION OF THE INVENTION

The inventors have made efforts to develop a method of completely bonding hard alloys together, in particular, cemented carbides, and consequently, have found that if the interface of a bonded layer has a hardness corresponding to at least 60% of that of the hard alloys, the strength of the bonded part can be considered sufficient.

On the contrary, if the hardness of the bonded layer is larger than the hard alloy, the toughness is low. Thus, it is most desirable to carry out welding in such a manner that the hardness of the bonded layer is as close as possible to that of the hard alloy.

In the present invention, a bonded layer having a hardness lower than that of cemented carbides but corresponding to at least 60% of that of cemented carbides is obtained by inserting a thin sheet of iron group metal or its alloy in between the butted or contacted surfaces of hard alloys, melting instantaneously the hard alloys and thin sheet at a high temperature, and forming an alloyed layer in which the iron group metal and hard alloy components are diffused into each other.

That is, the present invention provides a process for the production of bonded hard alloys, which comprises butting or contacting one or more kinds of hard alloys, inserting a thin sheet of iron group metal or its alloy as a filler metal in between the surfaces of the hard alloys, and applying a high energy beam to a part or all of the filler metal to melt and solidify it and thereby bond the hard alloys together.

The hard alloys used herein consist generally of at least one of carbides, nitrides, carbonitrides and carboxynitrides of the Group 4a, 5a and 6a elements of the Periodic Table, and solid solutions thereof, bonded by at least one iron group metal such as Co, Ni and Fe. In particular, cemented carbides such as WC-Co alloys and (Mo, W)C-Co alloys are preferably used. As the filler metal, there are generally used iron containing at most 0.5% by weight of carbon, steels (SS, SCM), Fe-Ni alloys, Co, Ni and Fe-Ni-Co alloys (Kovars), and as the high energy beam, there are generally used an electron beam and a laser beam. These filler metals generally have a melting point higher than that of the hard alloys.

Figure 1:
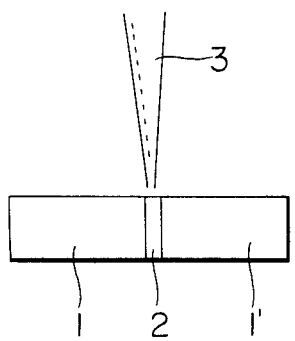
FIG. 1 is a schematic illustration of the process of the present invention.

In the practice of the present invention, as shown in FIG. 1, iron group metal sheet 2 with a thickness of 0.1 to 2 mm is inserted in between butted surfaces 1 and 1' of polished hard alloys and high energy beam 3 is irradiated on the inserted sheet to melt the hard alloys and sheet and to form an alloyed layer.

Figure 2:
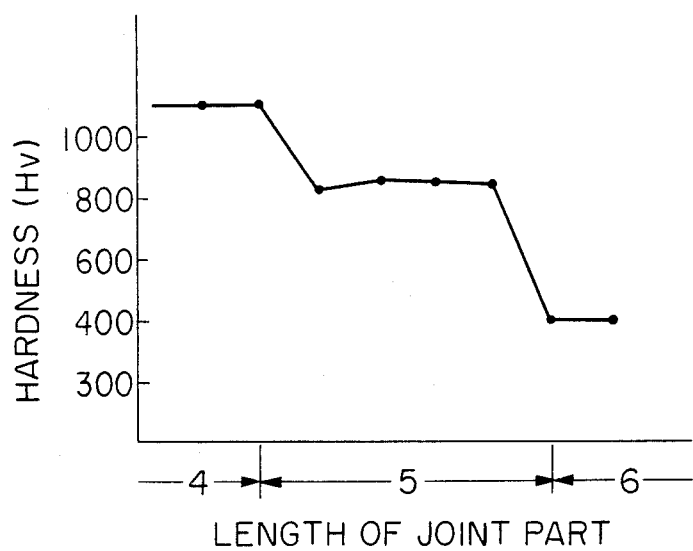
FIG. 2 is a graph showing the change of hardness of a bonded part according to the process of the present invention.

FIG. 2 shows the change in hardness when an Fe-Ni alloy and hard alloy are contacted and irradiated with an electron beam. The ordinate indicates Hv hardness and the abscissa indicates lengths of hard alloy 4, melted and solidified part 5 and filler metal part 6.

The alloy layer formed by fusion and diffusion of hard alloys and Fe-Ni alloy has an Hv hardness of 800, which corresponds to 70% or more of the Hv hardness of the hard alloy whose Hv hardness is 1100 for example. That is, it is assumed that the hardness of part 5 is markedly increased because W and C elements are diffused into the Fe-Ni alloy while the effect of rapid melting and cooling is accomplished by the use of an electron beam. When using Co or Ni as the filler metal, in particular, a further higher hardness can be obtained due to the fact that these elements are precipitated as WC in the alloy layer.

The most important feature of the present invention is that a filler material is inserted between the contacted surfaces of hard alloys and melted and bonded by applying a high energy beam. If the filler material is not used, for example, if tungsten carbide is melted at a temperature of 3000° C. or higher and vaporized as elements W and C, bonding is impossible. The use of the filler material results in lowering the melting and bonding temperature and preventing W and C from vaporization.

It is well known to use a filler material in bonding of different metals, e.g. in welding of Cu-Al. This serves to prevent formation of an intermetallic compound of the different metals. However, the inventors have no knowledge of an example wherein a filler material is used for the purpose of lowering the melting point and forming an alloy layer with a high hardness in welding materials of the same kind.

In the present invention, the filler material preferably has a thickness of 0.1 to 2 mm, since if the thickness if less than 0.1 mm, vaporization of the hard alloy cannot be prevented, while if more than 2 mm, a sufficient hardness cannot be obtained.

In one embodiment of the present invention, the surfaces of a hard alloy to be welded are subjected to polishing, degreasing and demagnetization, and an Fe group metal, in particular, an Fe-Ni alloy having a thermal expansion coefficient of $8-10 \times 10^{-6}$ cm/°C. similar to that of the hard alloy, or a Co alloy completely miscible with the hard alloy, is sandwiched in between the surfaces thereof. Then, welding is carried out by applying a high energy beam to the joint part in such a manner that both of the hard alloys are irradiated. Generally, an electron beam is used with an accelerating voltage of 60 to 150 KV, beam current of 10 to 50 mA and welding speed of 0.1 to 1 m/min. Laser beam can also be used under the similar conditions that a hard alloy and ferrous filler material can simultaneously be melted.

The following examples are given in order to illustrate the present invention in greater detail without limiting the same.

EXAMPLE 1

Figure 3:
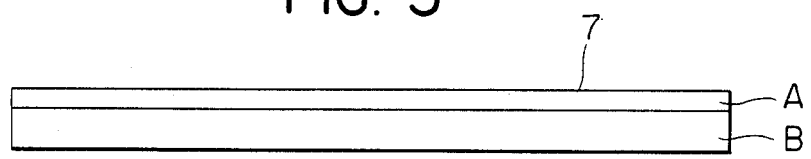
FIG. 3 is a front view of a cutting edge of the prior art.
Figure 4:
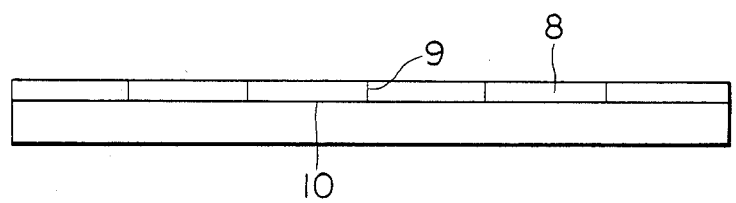
FIG. 4 is a front view of a cutting edge according to one embodiment of the present invention.

In designing cutter 7 composed of a cemented carbide edge A with a length of 3 m, width of 30 mm and thickness of 3 mm on steel B as shown in FIG. 3, the cemented carbide edge was formed by bonding cemented carbides 8 formed and sintered in a length of 50 cm as shown in FIG. 4. In FIG. 4, a thin sheet of Fe-42 wt% Ni alloy of 0.5 mm in thickness was inserted in between surfaces 9 of the cemented carbides to be bonded, and was welded by an electron beam, and joint surface 10 of cemented carbide 8 and steel B was welded by an electron beam, irradiated at an accelerating voltage of 150 KV, current of 20 mA and welding speed of 0.5 m/min, thus obtaining a long-size edge.

When a cemented carbide edge of 3 m in length was previously prepared and the joint surface of cemented carbide A and steel B shown in FIG. 3 was brazed with a silver braze, on the other hand, the cemented carbide edge was warped and a part of the cmeneted carbide was cracked.

The long-size edge of FIG. 4 prepared according to the present invention encountered no deformation, nor crack. The bonded cemented carbide layer showed an Hv hardness of 900. When the cutter obtained by the process of the present invention was subjected to cutting of paper, a uniform cutting quality was obtained without wearing of the bonded layer.

EXAMPLE 2

Figure 5:
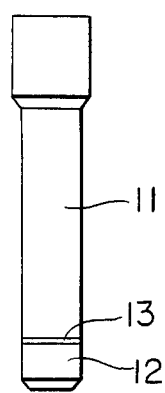
FIG. 5 is a front view of a punch according to another embodiment of the present invention.

The end of a punch with a diameter of 10 mm and a length of 70 mm shown in FIG. 5 was cut by 10 mm. Shank part 11 was of WC-20 wt % Co alloy and end part 12 was of WC-8 wt % Co alloy. A thin sheet 13 of Co with a thickness of 0.3 mm was inserted in between the butted surfaces of shank part 11 and end part 12 and subjected to welding by an electron beam (accelerating voltage: 150 KV; electric current: 20 mA; welding speed: 0.5 m/min). The thus resulting punch was a composite tool composed of an end part of cemented carbide having excellent wear resistance, and a shank part of cemented carbide having excellent toughness.

For comparison, punches were respectively made of WC-8 wt % Co alloy, WC-20 wt % Co alloy and WC-15 wt % Co alloy alone and subjected to comparative tests with the composite punch of the present invention. When a silicon steel plate with a thickness of 0.5 mm was punched thereby, there were obtained results shown in the following Table:

TABLE

|  | Life (hr) | Cause of Failure |
|---|---|---|
| WC - 8% Co alloy | 50 | fracture |
| WC - 15% Co alloy | 100 | wear |
| WC - 20% Co alloy | 20 | deformation |
| Composite Punch of Invention | 200 | Normal wear |

The composite punch bonded by the use of an electron beam showed a better performance than the punches of the prior art.

What is claimed is:

1. A process for the production of bonded hard alloys, which comprises inserting a sheet of a material selected from the group consisting of an iron group metal and an alloy thereof as a filler metal between the surfaces, to be bonded, of at least one kind of hard alloy selected from the group consisting of carbides, nitrides, carbonitrides and carboxynitrides of Group 4a, 5a and 6a elements of the Periodic Table and solid solutions thereof, and applying a high energy beam to at least part of the sheet to melt and solidify the sheet in a slit form and thereby bond the hard alloys together.

2. The process of claim 1, wherein the filler metal is selected from the group consisting of iron containing at most 0.5 % by weight of carbon, steels, Fe-Ni alloys, Co, Ni and Fe-Ni-Co alloys.

3. The process of claim 1, wherein the sheet has a thickness of 0.1 to 2 mm.

4. The process of claim 1, wherein the high energy beam is an electron beam or laser beam.

5. The process of claim 4, wherein the electron beam is irradiated with an accelerating voltage of 60 to 150 KV, beam current of 10 to 50 mA and welding speed of 0.1 to 1 m/min.

* * * * *